United States Patent [19]

Shimizu et al.

[11] Patent Number: 5,284,219
[45] Date of Patent: Feb. 8, 1994

[54] STEERING APPARATUS WITH VARIABLE STEERING ANGLE RATIO

[75] Inventors: Yasuo Shimizu; Toshitake Kawai; Junji Yuzuriha, all of Tochigi, Japan

[73] Assignee: Honda Giken Kogyo Kabushiki Kaisha, Tokyo, Japan

[21] Appl. No.: 826,043

[22] Filed: Jan. 27, 1992

[30] Foreign Application Priority Data

Jan. 25, 1991 [JP] Japan .................. 3-025553

[51] Int. Cl.$^5$ .................. B62D 3/08; B62D 6/02
[52] U.S. Cl. .................. 180/79.1; 180/79; 180/79.3
[58] Field of Search .............. 180/79.1, 79.3, 79

[56] References Cited

U.S. PATENT DOCUMENTS 5,174,407 12/1992 Shimizu et al. .................. 180/79.1

FOREIGN PATENT DOCUMENTS 0310729 4/1989 European Pat. Off. .
61-122075 6/1986 Japan .
2248216A 4/1992 United Kingdom .

Primary Examiner—Mitchell J. Hill
Attorney, Agent, or Firm—Armstrong, Westerman, Hattori, McLeland & Naughton

[57] ABSTRACT

A steering apparatus steers a steerable road wheel in response to turning movement of a steering wheel with a variable steering angle ratio therebetween. The steering apparatus includes a first member operatively coupled to either one of the steerable road wheel and the steering wheel, and a second member operatively coupled to the other of the steerable road wheel and the steering wheel. The first member has a portion engaging the second member at a variable engaging position that is movable on a predetermined path. The steering angle ratio varies when the engaging position varies. When the steering angle ratio varies with the first and second members in their respective neutral positions, the first and second members remain completely still, and their neutral positions are kept in alignment with each other.

4 Claims, 3 Drawing Sheets

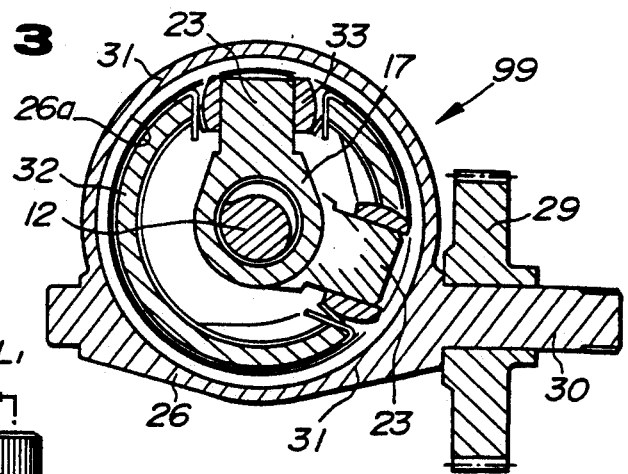
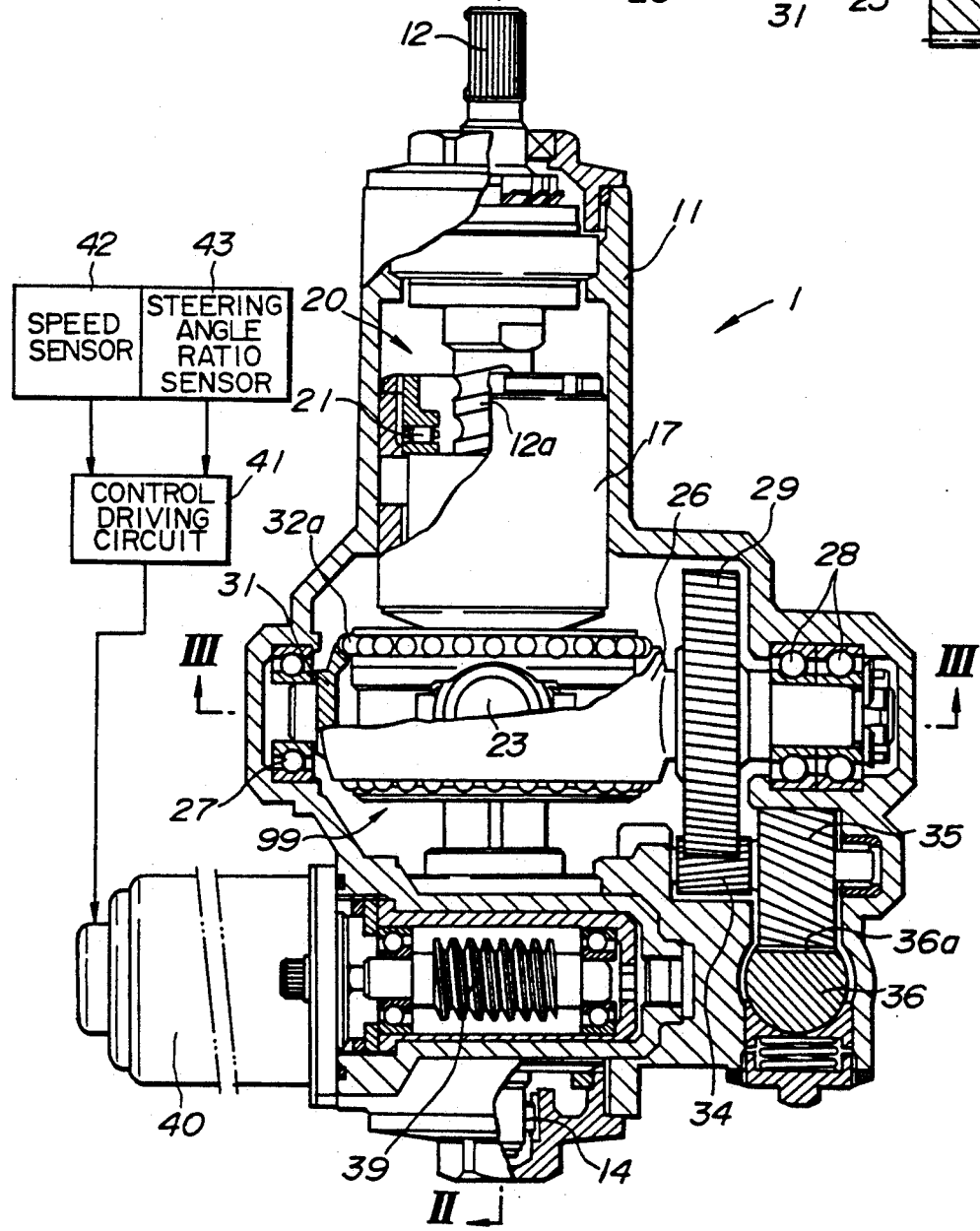

STEERING APPARATUS WITH VARIABLE STEERING ANGLE RATIO

BACKGROUND OF THE INVENTION

1 Field of the Invention:

The present invention relates to a steering apparatus for steering a motor vehicle, the steering apparatus being capable of varying the ratio (steering angle ratio) of a steered angle of a steerable road wheel to a steering angle of a steering wheel.

2 Description of the Relevant Art:

One conventional steering apparatus with a variable steering angle ratio for a motor vehicle having steerable road wheels, is disclosed in Japanese Laid-Open Patent Publication No. 61-122075, for example. The disclosed steering apparatus comprises a planetary gear mechanism disposed in a steering force transmitting path between a steering wheel and a steering gear mechanism. The planetary gear mechanism has a sun gear coupled to the steering wheel, a ring gear coupled to the steering gear mechanism, and a carrier coupled to a motor. The carrier is driven by the motor depending on the speed of travel of the motor vehicle for adjusting the steering angle ratio.

In the conventional steering apparatus with the variable steering angle ratio, the sun gear, the carrier, and the ring gear of the planetary gear mechanism are rotatable independently of each other. Therefore, it is difficult to align the neutral position of the steering wheel with the neutral position of the steerable road wheels.

Another problem of the conventional steering apparatus with the variable steering angle ratio is that the motor operates for a long period of time and consumes a large amount of electric energy because the motor is energized each time the steering wheel is turned.

The present invention has been made in an effort to solve the above problems of the conventional steering apparatus with the variable steering angle ratio.

SUMMARY OF THE INVENTION

It is an object of the present invention to provide a steering apparatus with a variable steering angle ratio, which allows the neutral position of a steering wheel to be easily aligned with the neutral position of steerable road wheels and which consumes a relatively small amount of electric energy.

To achieve the above object, there is provided a steering apparatus for steering a steerable road wheel in response to turning movement of a steering wheel with a variable steering angle ratio therebetween, comprising a ball screw mechanism having a screw shaft adapted to be coupled to either one of the steerable road wheel and the steering wheel and rotatable about a first axis in response to rotation of the steerable road wheel or the steering wheel, and a ball nut threaded over the screw shaft through a plurality of circulating balls interposed therebetween, an angularly movable member adapted to be coupled to the other of the steerable road wheel and the steering wheel, and angularly movable about a second axis in response to turning movement of the steerable road wheel or the steering wheel, a conversion mechanism having a conversion member mounted on the ball nut for linear movement along the first axis in unison with the ball nut and angular movement about the first axis, and a lever member held in engagement with the conversion member at a position and angularly movable in unison with the angularly movable member, for effecting conversion between linear movement of the conversion member and angular movement of the lever member, with the distance between the position and the second axis being variable in response to angular movement of the conversion member about the first axis, and a drive mechanism for angularly moving the conversion member about the first axis.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 1 is a longitudinal cross-sectional view of a steering apparatus with a variable steering angle ratio according to a first embodiment of the present invention;

FIG. 3 is cross-sectional view taken along line III—III of FIG. 1; and

DETAILED DESCRIPTION OF THE PREFERRED EMBODIMENTS

Figure 2:
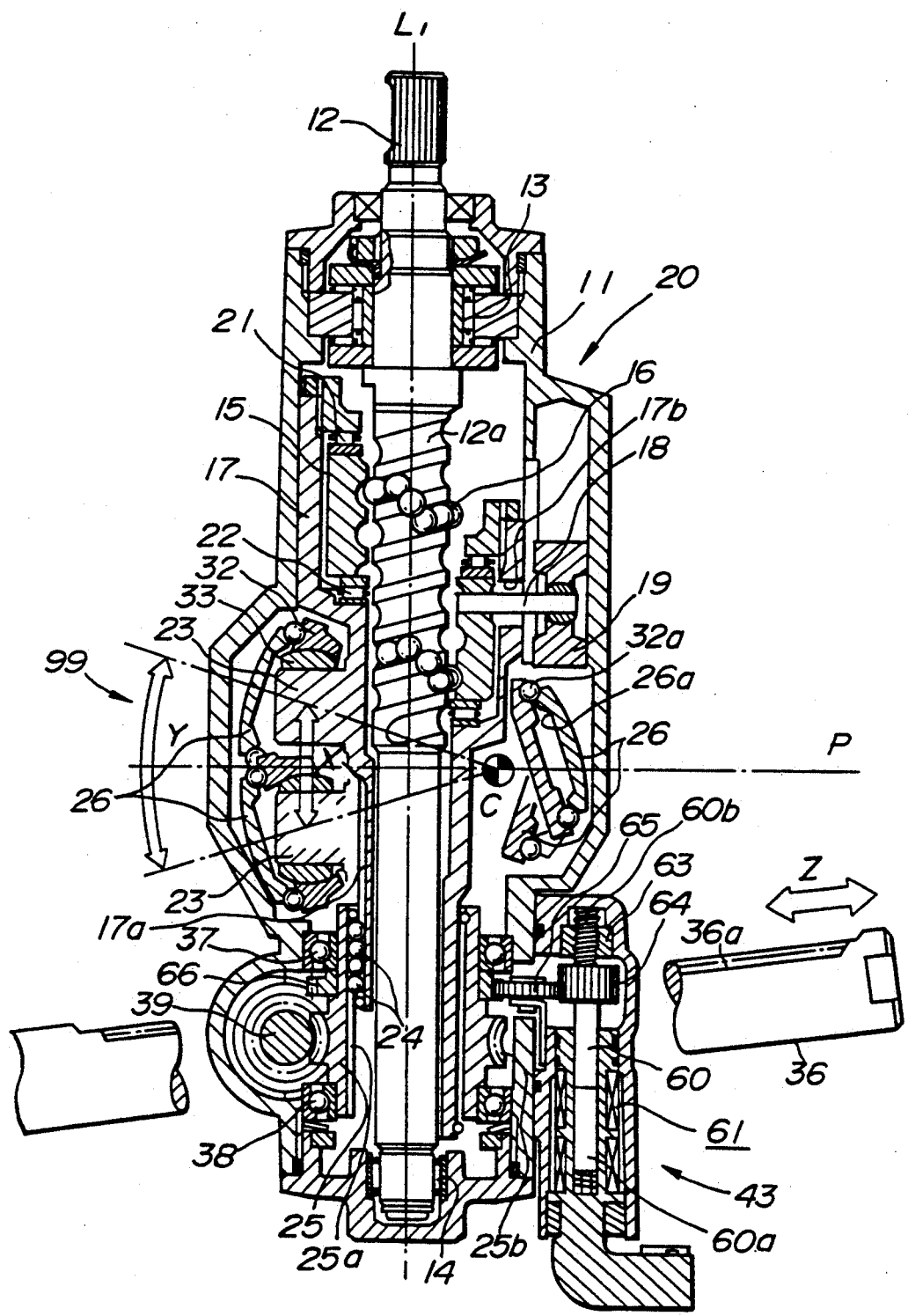
FIG. 2 is cross-sectional view taken along line II—II of FIG. 1.

FIGS. 1 through 3 show a steering apparatus 1 with a variable steering angle ratio according to a first embodiment of the present invention. The steering apparatus 1 has a case 11 mounted on the vehicle body (not shown) of a motor vehicle. A steering shaft 12 having a central axis L1 that extends vertically in FIG. 1 is rotatably supported in the case 11 by bearings 13, 14. The steering shaft 12 has an upper end projecting out of the case 11 and coupled to a steering wheel (not shown) through a universal joint or the like (not shown). The bearing 13 has an inner race substantially channel-shaped in cross section and fixed to the steering shaft 12, and an outer race fixed to the case 11. The inner and outer races are rotatable with respect to each other. The steering shaft 12 is prevented from axially moving with respect to the case 11.

The steering shaft 12 has an externally threaded portion (screw shaft) 12a located within the case 11. A ball nut 15 accommodated in a conversion nut member 17 is coaxially and relatively rotatably disposed on the externally threaded portion 12a with a number of circulating balls 16 between the externally threaded portion 12a and the ball nut 15. The ball nut 15 has a pin 18 radially mounted thereon and extending radially outwardly through a slot 17a defined circumferentially in the conversion nut member 17. The ball nut 15 has a hole (not shown) through which the balls 16 circulate. The pin 18 has a radially outer end engaging a slider 19 that is positioned radially outwardly of the conversion nut member 17 and slidably supported in the case 11 for axial sliding movement along the axis L1. Therefore, the ball nut 15 is prevented from rotating about the axis L1 by the slider 19. The externally threaded portion 12a, the ball nut 15, and the balls 16 jointly serve as a ball screw mechanism 20. The ball nut 15 is axially displaceable in response to rotation of the externally threaded portion 12a about the axis L1.

As shown in FIG. 2, the conversion nut member 17 comprises a hollow cylinder through which the steering shaft 12 loosely extends in the axial direction. The conversion nut member 17 is angularly movably and axially displaceably disposed in the case 11. The ball nut 15 is rotatably mounted in an upper portion of the conversion nut member 17 by bearings 21, 22. A longitudinal slot 17b is defined axially in a lower portion of the conversion nut member 17. The conversion nut member 17 has an integral arm 23 projecting radially outwardly from a central portion thereof in a direction normal to the axis L1. The conversion nut member 17 is axially movable with the ball nut 15. A plurality of balls 24 are rollingly fitted in the longitudinal slot 17b. A worm wheel 25 is operatively coupled to the lower portion of the conversion nut member 17 through the balls 24 such that the worm wheel 25 is angularly movable in unison with and axially movable with respect to the conversion nut member 17. The arm 23 of the conversion nut member 17 has a radially outer distal end engaging a lever member 26 as described below.

As shown in FIG. 3, the lever member 26 comprises a main body 31 in the form of a short hollow cylinder or pan, and a shaft or turn member 30 integral with the main body 31. The shaft 30 is supported in the case 11 by bearings 27, 28 so that the shaft 30 and the main body 31 are angularly movable about an axis C (see FIG. 2) perpendicular to the axis L1. The main body 31 has an engaging hole 26a of large diameter through which the conversion nut member 17 extends. A first gear 29 is fixedly mounted on the proximal end of the shaft 30. FIGS. 2 and 3 show both extreme positions to which the arm 23 of the conversion nut member 23 and the lever member 26 are movable.

The arm 23 is supported in the engaging hole 26a of the lever member 26 by a spherical bearing 33 and a roller bearing 32. The roller bearing 32 has two arrays of balls 32a respectively above and below the arm 23. The arm 23 is therefore freely pivotally movable with respect to the roller bearing 32. As a result, the conversion nut member 17 is not only movable in the direction of the axis L1 but also angularly movable about the axis L1 while allowing the radially outer distal end of the arm 23 to move along the inner circumferential surface of the engaging hole 26a. The conversion nut member 17 and the lever member 26 jointly serve as a conversion mechanism 99.

As shown in FIG. 1, the first gear 29 is held in mesh with a second gear 34 coaxially coupled to a third gear 35 that is held in mesh with a rack 36a of a rack shaft 36. The rack shaft 36 has opposite ends coupled respectively to the knuckle arms of steerable road wheels of the motor vehicle through tie rods or the like (not shown). The third gear 35 and the rack shaft 36 jointly constitute a rack-and-pinion steering gear mechanism for transmitting steering forces from the steering wheel to the steerable road wheels.

The worm wheel 25, through which the conversion nut member 17 axially extends, is rotatably supported in a lower portion of the case 11 by bearings 37, 38 in coaxial relationship to the conversion nut member 17. The worm wheel 25 has a longitudinal slot 25a defined axially in an inner circumferential surface thereof. The balls 24 are rollingly supported in the slot 25a and the slot 17a of the conversion nut member 17. The worm wheel 25 has a gear 25b disposed on an outer circumferential surface thereof and held in mesh with a worm 39 fixed to the output shaft of a motor 40. The worm wheel 25, the worm 39, and the motor 40 jointly serve as a drive mechanism for rotating the conversion nut member 17 about the axis L1.

As shown in FIG. 1, the motor 40 is electrically connected to a control circuit 41 which energizes the motor 40 to rotate the worm 39 about its own axis. To the control circuit 41, there are electrically connected a vehicle speed sensor 42 and a steering angle ratio sensor 43. Therefore, the control circuit 42 energizes the motor 40 to control the angular displacement of the output shaft of the motor 40 based on a vehicle speed signal from the vehicle speed sensor 42 and a steering angle ratio signal from the steering angle ratio sensor 43. The control circuit 41 is arranged to control the steering angle ratio under feedback control such that the steering angle ratio will be smaller in a higher vehicle speed range and larger in a lower vehicle speed range.

As shown in FIG. 2, the steering angle ratio sensor 43 comprises a detection shaft 60 rotatably and axially movably supported parallel to the conversion nut member 17, and a differential transformer 61 for detecting an axial displacement of a core 60a fixed coaxially to the detection shaft 60. The detection shaft 60 has an externally threaded upper end portion 60b held in mesh with a nut 63 fixed with respect to the case 11. A gear 64 is fixedly mounted on the detection shaft 60 and meshes with a gear 65 that is held in mesh with a gear 66 fixedly mounted on the worm wheel 25. When the worm wheel 25 rotates about the axis L1, the detection shaft 60 rotates about its own axis and is hence axially displaced. At this time, the axial position of the core 60a, i.e., the angular displacement of the worm wheel 25 corresponding to a steering angle ratio, is detected by the differential transformer 61.

The steering angle ratio sensor 43 may be arranged to calculate a steering angle ratio by detecting in combination the angle through which the steering wheel is turned and the angle through which the steerable road wheels are steered, or the axial displacement of the ball nut 15 and the angular displacement of the gear 29, or the angular displacement of the worm wheel 25 or the steering shaft 12 and the axial displacement of the rack shaft 36.

The steering apparatus 1 operates as follows: When the steering wheel is turned, the steering shaft 12 is turned about the axis L1 to displace the ball nut 15 along the axis L1. The conversion nut member 17 linearly moves in unison with the ball nut 15 in the axial direction indicated by the arrow X in FIG. 2. At this time, the arm 23 of the conversion nut member 17 engages in the engaging hole 26a of the lever member 26 against axial displacement relative thereto. Therefore, when the conversion nut member 17 is displaced in the axial direction X, the lever member 26 angularly moves in unison with the first gear 29 about the axis C in the direction indicated by the arrow Y. The angular movement of the first gear 29 causes the second and third gears 34, 35 to angularly move at augmented speeds, displacing the rack shaft 36 along its axis thereby to steer the steerable road wheels.

The conversion nut member 17 is angularly movable with the worm wheel 25, and operatively coupled to the motor 40 through the worm wheel 25 and the worm 39. The conversion nut member 17 is angularly moved about the axis L1 by the motor 40 depending on the vehicle speed and the steering angle ratio. When the conversion nut member 17 is angularly moved, the distal end of the arm 23 is angularly displaced against the inner circumferential surface of the engaging hole 26a of the lever member 26. As a result, the position in which the arm 23 engages the inner circumferential surface of the engaging hole 26a with respect to the axis C of angular movement of the lever member 26 varies. Therefore, the distance from the axis C of angular movement of the lever member 26 to the position in which the arm 23 engages the inner circumferential surface of the engaging hole 26a varies in response to angular movement of the conversion nut member 17 about the axis L1. The ratio of the angular displacement of the lever member 26 in the direction Y to the axial displacement of the conversion nut member 17 in the direction X, i.e., the steering angle ratio, varies depending on the above distance. The steering angle ratio is controlled to be smaller when the vehicle speed is higher and larger when the vehicle speed is lower, as described above. Therefore, the motor vehicle is made highly stable when steered while it is running in the high vehicle speed range, and the motor vehicle is able to make small turns while it is running in the low vehicle speed range.

The angular position of the lever member 26 about the axis C is determined by the axial position of the conversion nut member 17. Consequently, the neutral position of the lever member 26 and the neutral position of the conversion nut member 17 will not be displaced out of alignment when the steering angle ratio varies.

Stated otherwise, when the steering wheel and the steerable road wheels are in their neutral positions, the arm 23 is in its neutral position in the direction X and the lever member 26 is in its neutral position in the direction Y. When the conversion nut member 17 is angularly moved about the axis L1 in order to vary the steering angle ratio under this condition, the lever member 26 remains completely still. Thus, the neutral position of the steering wheel and the neutral position of the steerable road wheels will not be affected when the steering angle ratio varies. Accordingly, the neutral position of the steering wheel and the neutral position of the steerable road wheels are kept in alignment with each other irrespective of any change in the steering angle ratio.

The motor 40 is energized only when the steering angle ratio is to be varied. Therefore, the motor 40 consumes a relatively small amount of electric energy, and remains durable for a long period of time.

The steering apparatus 1 according to the first embodiment of the present invention thus allows the neutral position of the steering wheel to be easily aligned with the neutral position of the steerable road wheels and also consumes a relatively small amount of electric energy.

The steering apparatus 1 is summarized more simply as follows: The conversion nut member 17 is operatively coupled to the steering wheel, and is linearly moved along the axis L1 when the steering wheel is turned, the conversion nut member 17 having a neutral position. The lever member 26 is operatively coupled to the steerable road wheels, and is angularly moved about the axis C that extends perpendicularly to but is offset from the axis L1 when the steerable road wheels are steered, the lever member 26 having a neutral position. The arm 23, which is part of the conversion nut member 17, is positionally variably held in engagement with the lever member 26. The position in which the arm 23 engages the lever member 26 is located within a plane P (see FIG. 2) containing the axis C, and is movable on a path (i.e., the bearing 32) equidistantly spaced from the axis L1. This arrangement prevents the neutral position of the steering wheel and the neutral position of the steerable road wheels from being affected by a change in the steering angle ratio.

Figure 4:
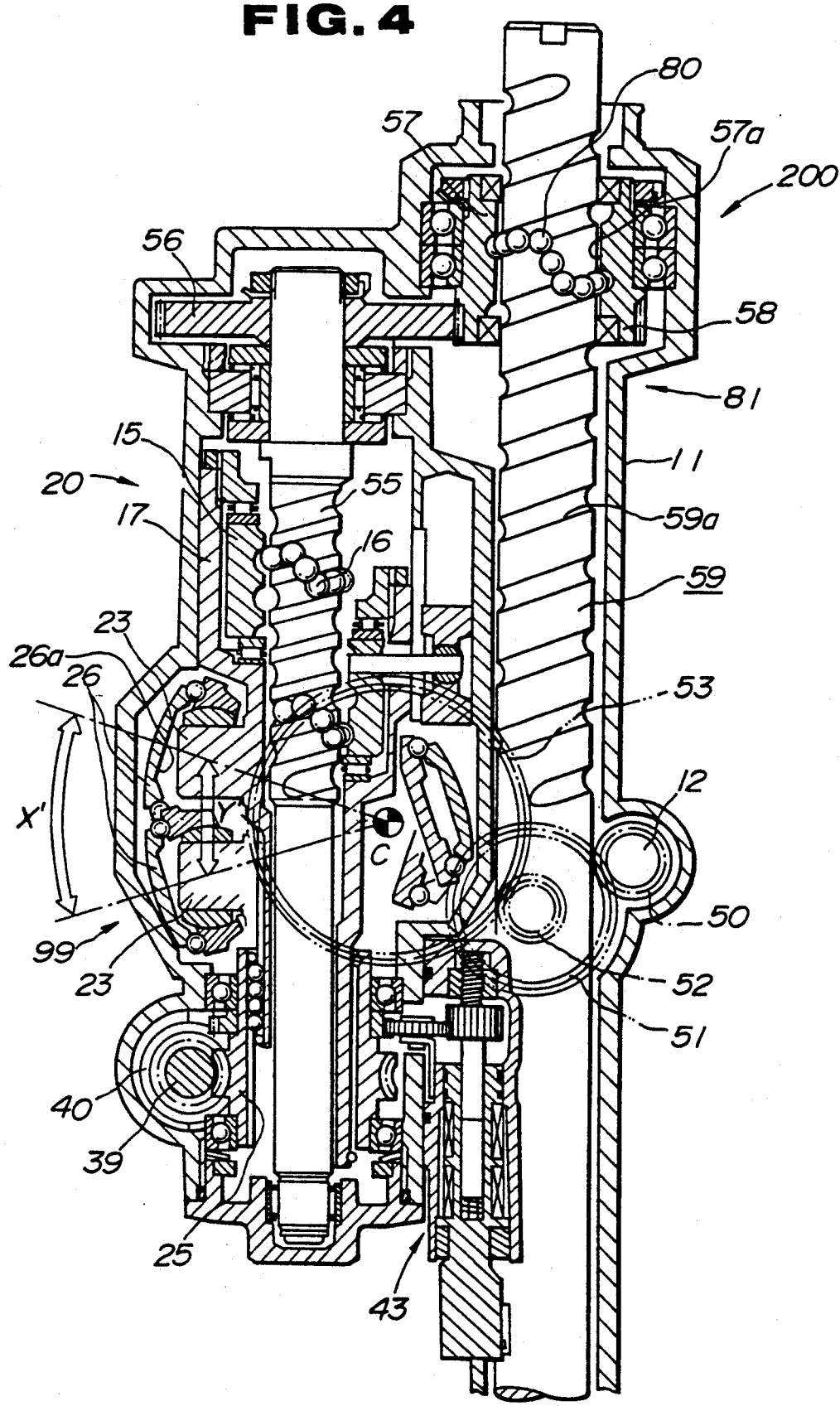
FIG. 4 is a longitudinal cross-sectional view of a steering apparatus with a variable steering angle ratio according to a first embodiment of the present invention.

FIG. 4 shows a steering apparatus 200 with a variable steering angle ratio according to a second embodiment of the present invention. Those parts of the steering apparatus 200 which are identical to those of the steering apparatus 1 according to the first embodiment are denoted by identical reference characters, and will not be described in detail below. As with FIGS. 2 and 3, FIG. 4 shows both extreme positions to which the arm 23 of the conversion nut member 23 and the lever member 26 are movable.

The steering apparatus 20 basically differs from the steering apparatus 1 in that steering forces from the steering wheel are transmitted to the steerable road wheels in a direction that is opposite to the direction of steering forces in the steering apparatus 1.

The steering apparatus 200 has a gear 50 fixed to the steering shaft 12 and held in mesh with a transmission gear 51 that is rotatable in unison with a gear 52. The gear 52 is held in mesh with a gear 53 fixed to the lever member 26 in coaxial relationship to the axis C. When the steering wheel coupled to the steering shaft 12 is turned, the gear 50 is rotated to cause the gears 51, 52 to rotate the gear 53, thereby turning the lever member 26 about the axis C.

As with the steering apparatus 1 according to the first embodiment, the arm 23 of the conversion nut member 17 is movably held in engagement with the inner circumferential surface of the engaging hole 26a of the lever member 26, and is axially displaceable in unison with the lever member 26. The ball nut 15 of the ball screw mechanism 20 is rotatably mounted in the conversion nut member 17, and is axially displaceable in unison with the conversion unit 17. A screw shaft 55 is threaded in the ball nut 15 through the balls 16. The lower end of the conversion nut member 17 is operatively coupled to the motor 40.

A gear 56 is fixedly mounted on the upper end (as seen in FIG. 4) of the screw shaft 55, and meshes with a gear 58 on the outer circumferential surface of a ball nut 57. The ball nut 57 is in the form of a hollow cylinder through which a relay rod 59 extends. The ball nut 57 has an internally threaded portion 57a on the inner circumferential surface thereof. The relay rod 59 has an externally threaded portion 59a on the outer circumferential surface thereof. The ball nut 57 is fitted over the relay rod 59 by a number of circulating balls 80 received on the internally and externally threaded portions 57a, 59a thereof, thereby providing a ball screw mechanism 81. The relay rod 59 is nonrotatably and axially displaceably supported in the case 11, and has opposite ends coupled to the knuckle arms of steerable road wheels of a motor vehicle.

When the steering wheel is turned, the lever member 26 is angularly moved about the axis C in the direction indicated by the arrow X'. The angular movement of the lever member 26 is converted into an axial displacement of the conversion nut member 17 in the axial direction indicated by the arrow Y. The ball nut 15, which is also axially moved in unison with the conversion nut member 17, then rotates the screw shaft 55 about its own axis. The rotation of the screw shaft 55 is transmitted through the gears 56, 58 to the ball nut 57, which is rotated to axially displace the relay rod 59, thereby steering the steerable road wheels coupled thereto.

In the steering apparatus 200, the conversion nut member 17 can be angularly moved by the motor 40 through the worm wheel 25 for varying the position where the arm 23 engages in the engaging hole 26a thereby to vary the steering angle ratio. The motor 40 is controlled depending on the speed of travel of the motor vehicle such that the motor vehicle is highly stable when steered in the high speed range and can make small turns when steered in the low speed range.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

I claim:

1. A steering apparatus for steering a steerable road wheel in response to turning movement of a steering wheel with a variable steering angle ratio therebetween, comprising:

a ball screw mechanism having a screw shaft adapted to be coupled to one of said steerable road wheel and said steering wheel and rotatable about a first axis in response to rotation of said one of said steerable road wheel and said steering wheel, and a ball nut threaded over said screw shaft through a plurality of circulating balls interposed therebetween;

an angularly movable member adapted to be coupled to an other of said steerable road wheel and said steering wheel, and angularly movable about a second axis in response to turning movement of said one of said steerable road wheel and said steering wheel;

a conversion mechanism having a conversion member mounted on said ball nut for linear movement along said first axis in unison with said ball nut and angular movement along said first axis, and a lever member held in engagement with said conversion member at a position and angularly movable in unison with said angularly movable member, for effecting conversion between linear movement of said conversion member and angular movement of said lever member, with the distance between said position and said second axis being variable in response to angular movement of said conversion member about said first axis; and a drive mechanism for angularly moving said conversion member about said axis.

2. A steering apparatus for steering a steerable road wheel in response to turning movement of a steering wheel with a variable steering angle ratio therebetween, comprising:

a first member adapted to be operatively coupled to either one of the steerable road wheel and the steering wheel and linearly movable along a first axis when said one of the steerable road wheel and the steering wheel is turned, said first member having a neutral position; and a second member adapted to be operatively coupled to the other of the steerable road wheel and the steering wheel and angularly movable about a second axis when said other of the steerable road wheel and the steering wheel is turned, said second axis being offset from said first axis, said second member having a neutral position;

said first member having a portion engaging said second member at a variable position;

said variable position being movable on a path lying in a plane containing said second axis and equidistantly spaced from said first axis.

3. A steering apparatus according to claim 2, further including a drive mechanism for angularly moving said first member about said first axis to move said variable position on said path for varying the steering angle ratio.

4. A steering apparatus according to claim 2, further including a ball screw mechanism for converting angular movement of the steering wheel into linear movement and transmitting the linear movement to said first member.

* * * * *